(12) United States Patent
Poorebrahim Gilkalaye et al.

(10) Patent No.: US 11,792,646 B2
(45) Date of Patent: Oct. 17, 2023

(54) SYSTEMS AND METHODS FOR PROVIDING A MULTI-PARTY COMPUTATION SYSTEM FOR NEURAL NETWORKS

(71) Applicant: TRIPLEBLIND, INC., Kansas City, MO (US)

(72) Inventors: Babak Poorebrahim Gilkalaye, Kansas City, MO (US); David Norman Wagner, Shawnee, KS (US); Riddhiman Das, Parkville, MO (US); Andrew James Rademacher, Kansas City, MO (US); Craig Gentry, New York, NY (US); Gharib Gharibi, Overland Park, KS (US); Greg Storm, Kansas City, MO (US); Stephen Scott Penrod, Kansas City, MO (US)

(73) Assignee: TripleBlind, Inc., Kansas City, MO (US)

( * ) Notice: Subject to any disclaimer, the term of this patent is extended or adjusted under 35 U.S.C. 154(b) by 0 days.

(21) Appl. No.: 17/874,599

(22) Filed: Jul. 27, 2022

(65) Prior Publication Data
US 2023/0049860 A1 Feb. 16, 2023

Related U.S. Application Data

(60) Provisional application No. 63/226,135, filed on Jul. 27, 2021.

(51) Int. Cl.
*H04W 12/06* (2021.01)
*G06F 21/62* (2013.01)
*G06F 9/54* (2006.01)

(52) U.S. Cl.
CPC ............ *H04W 12/06* (2013.01); *G06F 9/547* (2013.01); *G06F 21/6218* (2013.01)

(58) Field of Classification Search
None
See application file for complete search history.

(56) References Cited

U.S. PATENT DOCUMENTS

| 6,668,325 | B1 | 12/2003 | Collberg |
| 9,464,043 | B2 | 10/2016 | Roberge |
| 10,311,372 | B1 | 6/2019 | Hotchkies |

(Continued)

OTHER PUBLICATIONS

Chandiramani, et al., "Performance Analysis and Distributed and Federated Learning Models on Private Data", Procedia Computer Science, 165(2019), pp. 349-355. (Year: 2019).

*Primary Examiner* — Brandon Hoffman

(57) ABSTRACT

A system and method are disclosed for secure multi-party computations. The system performs operations including establishing an API for coordinating joint operations between a first access point and a second access point related to performing a secure prediction task in which the first access point and the second access point will perform private computation of first data and second data without the parties having access to each other's data. The operations include storing a list of assets representing metadata about the first data and the second data, receiving a selection of the second data for use with the first data, managing an authentication and authorization of communications between the first access point and the second access point and performing the secure prediction task using the second data operating on the first data.

22 Claims, 6 Drawing Sheets

(56) References Cited

U.S. PATENT DOCUMENTS

| | | |
|---|---|---|
| 10,360,220 B1 | 7/2019 | Gupta |
| 2003/0009482 A1 | 1/2003 | Benerjee |
| 2007/0192864 A1 | 8/2007 | Bryant |
| 2015/0089243 A1 | 3/2015 | Veugen |
| 2015/0156204 A1 | 6/2015 | Resch |
| 2016/0156595 A1 | 6/2016 | Wu |
| 2016/0205095 A1 | 7/2016 | Morel |
| 2017/0372201 A1 | 12/2017 | Gupta |
| 2018/0205707 A1 | 7/2018 | Bellala |
| 2018/0212770 A1 | 7/2018 | Costa |
| 2019/0050204 A1 | 2/2019 | Hutter |
| 2019/0073580 A1 | 3/2019 | Dzhulgakov |
| 2019/0073586 A1 | 3/2019 | Chen |
| 2019/0073590 A1 | 3/2019 | Wu |
| 2019/0114511 A1 | 4/2019 | Gao et al. |
| 2019/0208417 A1 | 7/2019 | Kang |
| 2019/0318421 A1 | 10/2019 | Lyonnet |
| 2020/0104670 A1 | 4/2020 | Seo |
| 2020/0167127 A1 | 5/2020 | Lokappa |
| 2020/0167834 A1 | 5/2020 | Matsuoka |
| 2020/0242492 A1 | 7/2020 | Goel |
| 2020/0358599 A1 | 11/2020 | Baracaldo Angel |
| 2020/0364608 A1 | 11/2020 | Anwar |
| 2020/0387797 A1 | 12/2020 | Ryan et al. |
| 2020/0402625 A1* | 12/2020 | Aravamudan ........ G06F 21/602 |
| 2021/0073036 A1 | 3/2021 | Kim |
| 2021/0089878 A1 | 3/2021 | Greenwald |
| 2021/0117578 A1* | 4/2021 | Cheruvu ................ G06F 21/85 |
| 2021/0192279 A1 | 6/2021 | Laaksonen et al. |
| 2021/0209247 A1 | 7/2021 | Mohassel |
| 2021/0209514 A1 | 7/2021 | Kim et al. |
| 2021/0264271 A1 | 8/2021 | Gebre |
| 2021/0406406 A1 | 12/2021 | Hutter |
| 2022/0351039 A1 | 11/2022 | Satheesh Kumar |

* cited by examiner

300

```
1   import tripleblind as tb
2
3   tb.initialize (api_token=tb.config.example)
4   tb.util.set_script_dir_current ( )
5
6   model = tb.Asset ( "model_public_id" )
7
8
9   job = tb.create_job (
10      job_name = "secure_MPC_test",
11      operation = model,
12      dataset = "test_image.jpg",
13      params = {
14              "security" : "smpc" ,
15              "data_type" : "image"
16              "data_shape" : [224 , 224 , 3]
17              }.
18
19  if job.submit ( ) :
20      job.wait_for_completion ( )
21
22      if job.success :
23          prediction = job.result.caption
24
```

FIG. 3 ated party to communicate directly with each other
SYSTEMS AND METHODS FOR PROVIDING A MULTI-PARTY COMPUTATION SYSTEM FOR NEURAL NETWORKS

PRIORITY CLAIM

The present application claims priority to U.S. Provisional Application No. 63/226,135, filed Jul. 27, 2021, which is incorporated herein by reference.

TECHNICAL FIELD

The present disclosure generally relates to a secure multi-party computation and more specifically to a system in which a router or computing device is configured to enable a first access point of a first entity and a second access point of a second entity to communicate directly with each other to perform a secure multi-party computation on their joint data and/or algorithm without each respective party having access to the other party's data or algorithm.

BACKGROUND

The rapid evolution of deep learning (DL) methods and tools have led to significant results across an ever-growing number of domains, showcasing that well-trained DL models are capable of assisting professionals in their expert domains, including medicine, speech, vision, and finance. Such powerful DL models present potential for research, collaboration, and monetization by providing them for prediction purposes. In contrast, parties with limited data and resources cannot train their own DL models and, therefore, could benefit from other parties' trained DL models to run advanced analysis and predictions on their data.

However, the use of prediction services between parties that hold sensitive data (e.g., medical and financial institutions) raises several justifiable privacy and intellectual property concerns and is subject to regulatory policies. Example policies include the European General Data Protection Regulation (GDPR), the California Consumer Privacy Act (CCPA), and even more strict laws that prohibit sharing the data outside a country's geographical borders, such as data residency laws in the United Arab Emirates (UAE), Indonesia, Malaysia, and others. Specifically, most existing prediction services either require the model provider to install their proprietary model on the user's device or require the user to upload their input data to the provider's service. The former approach reveals the model's intellectual property while the latter harms the data privacy.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates example computing code for access the secure inference service;

INTRODUCTION

Figure 1:
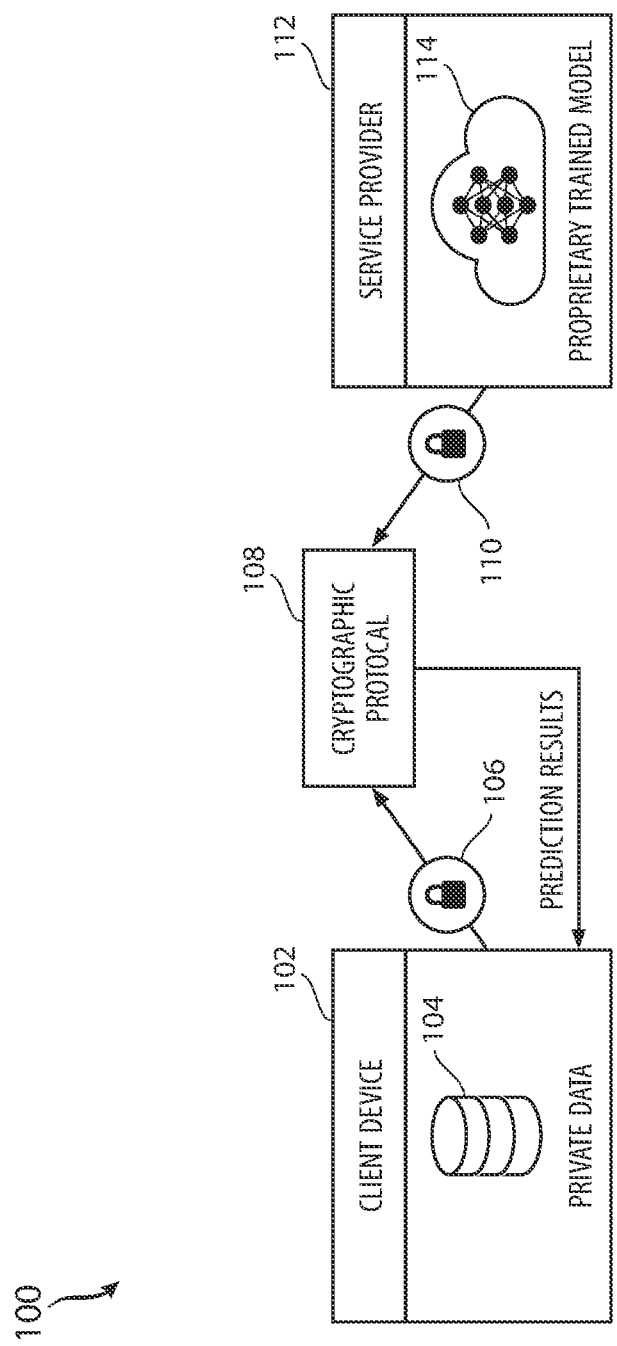
FIG. 1 illustrates a general architecture for a secure inference service between two parties: one holding the model while the other holds some private data.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the following description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

BRIEF DESCRIPTION

This disclosure addresses the fundamental issue raised above with respect to privacy problems that arise when model owners need to share models and data owners need to share data to be run on the models. The following first reviews the current state of the cryptography-based methods and highlights the state-of-the-art and how the disclosed concepts differ therefrom. This discussion includes reference to secure multi-party computation (MPC), homomorphic encryption, and trusted execution environments.

In general, secure training of deep learning models has been attempted. While secure MPC has been used in a wide range of applications from detecting tax fraud in business transactions to studying the gender pay gap, it is only applicable to a relatively small dataset but impractical to train deep learning models using big data. Moreover, MPC faces severe scalability challenges despite several attempts to scale its performance to many parties. Nevertheless, secure MPC is currently being used for the aggregation and averaging of models in decentralized learning approaches, such as secure averaging in federated learning. Moreover, secure MPC plays a significant role in most existing prediction systems.

The following discussion omits reference to secure training protocols since they are not the focus of this disclosure, and instead focuses on the related secure inference approaches for neural networks.

DL inference is the process of applying a trained model on new data to make a prediction; for example, running an X-ray image into a trained X-ray model to classify whether or not the input X-ray image shows any specific disease. The output of the model is referred to as the prediction result or simply prediction. In secure DL inference, there are a number of protocols. The majority of current approaches utilize secure MPC to implement their protocols. At a high-level, these protocols can be categorized into either 2-party compute (2PC) or 3-party compute (3PC). Overall, 2PC protocols are considered more secure than 3PC since in the latter two parties could collude to reveal the other party's data. In one aspect, the disclosed protocol can be considered a 3PC protocol because of the usage of the Beaver triple generator as disclosed herein. We note as well that while a 3PC protocol is mentioned as an example, this should not be considered a restrictive implementation since the system could extend the protocol to become a 2PC protocol. The system design can include several implementation techniques that prevent such colluding. For example, the trusted party (which can be the Beaver set generator) in the disclosed system can be positioned as a slim web server that includes four functions only which can prevent any outside parties from running other functionality. The disclosed current protocol implementation allows the system to convert it into a 2PC protocol using the learning with errors (LWE)-based beaver triple generation as mentioned above.

Homomorphic encryption, and specifically fully homomorphic encryption protocols, can be used to preserve the privacy of the data used in an DL task by encrypting the data with a key while preserving the structure of the underlying operations. For example, the structure can relate to the model layers in the case of deep learning. The user data is encrypted on a client machine and then sent to a server where the actual computations take place. Examples of this approach include n-Graph, which does not support rectified linear units (ReLU) in the neural network or other complicated activation functions. Another example is CryptoNets, which is one of the first works that utilized fully homomorphic encryption (FHE) for secure inference, and several others works that built on it. Another example is CHET, which is a compiler and runtime program for FHE neural network inference that also does not support ReLU and replaces them with polynomial approximations to efficiently use FHE for secure inference.

While FHE can preserve the privacy of the data via encryption, it still faces several challenges in the context of deep learning. For example, the supported operations on the encrypted data are limited to addition and multiplication, while other operations such as activation functions are often approximated using polynomials, which can result in significant accuracy degradation. Another critical limitation that prevents FHE from being widely adopted is its expensive computations and latency issues, which makes training medium to large-sized DL models impractical.

Trusted execution environments (or confidential computing) is discussed next. Hardware-based methods for privacy-preserving inference have gained much attention recently. Secure enclaves enable confidential computing, which is a process that ensures that different programs running on the same machine or cloud server cannot access one another's memory. This keeps data in use private. Confidential computing relies on the usage of secure enclaves such as Intel Software Guard Extensions (SGX) and provides cryptographic proof to compute in a secure container within an untrusted machine through memory isolation and encryption.

While secure enclaves can aid data privacy issues related to keeping data private from others with access to the same physical hardware on a public cloud, they still face several challenges, including that secure enclaves do not allow operations on European data to take place from the US and the currently available secure enclaves maintain low secure Processor Reserve Memory (PRM) that is not sufficient for even medium-sized DL models. For example, some of the Intel SGX maintains 128 MB of secure PRM, of which 90 MB is the Enclave Page Cache (EPC), while a ResNet-50v2 (a common DL model architecture) is of the size 102 MB. Overall, most existing confidential computing solutions could offer better efficiency than secure MPC protocols since the secured operations take place on the same machine; however, this efficiency comes at the price of a weaker threat model that requires trusting the hardware vendor and providing powerful defenses against secure enclave attacks.

DL inference attacks are also an issue. A wide range of inference attacks against deep learning models and the used test data have emerged. The underlying common factor among these attacks is that they do not require access to the used model, instead they mainly depend on the output of the prediction results. Therefore, secure MPC inference cannot defend against such attacks, since the attack uses the information resealed by the protocol. However, to defend against such attacks, a number of studies have presented several approaches, one approach being differential privacy for training DL models. Such privacy-preserving training methods are not an alternative to secure inference protocols-which are used for the inference task-but are complementary to the training process to present an end-to-end privacy-preserving deep learning.

In order to address the issues raised, the following is provided. A method can include (1) establishing an application programming interface for coordinating joint operations between a first access point associated with a first entity and a second access point associated with a second entity related to performing a secure prediction task in which the first access point and the second access point will perform private computation of first data of the first entity stored on the first access point and second data of the second entity stored on the second access point without the first entity having access to second data of the second entity having access to the first data, (2) storing a list of assets on the data storage device, the list of assets representing metadata about the first data and the second data, such as the data type, size, shape, model input shape while the first data remains stored on the first access point and the second data remains stored on the second access point, (3) receiving a selection of the second data from the second entity for use with the first data from the first entity, (4) managing, based on the selection of the second data for use with the first data, an authentication and authorization of communications between the first access point and the second access point without storing the first data or the second data on the system and (5) performing the secure prediction task using the second data operating on the first data. Note that the data storage device stores lists about the data and model at access points 1 and 2, such as their type, location, hosting organization name, etc.; but never stores any part of their actual data.

A system can include a processor and a computer-readable storage device storing instructions which, when executed by the processor, cause the processor to perform operations or steps including one or more of the steps outlined above.

DETAILED DESCRIPTION

As introduced above, the disclosure in this case introduces a new infrastructure that enables parties such as a data provider and an algorithm provider (e.g., DL model) to be able to select data for use in a secure multi-party computation via a new application programming interface and new user interfaces that enable the process to easily proceed to a conclusion where the result of an algorithm operating on data can be reported to the proper party.

To mitigate the privacy risks identified above, a number of studies suggested the usage of cryptography-based techniques such as fully homomorphic encryption (FHE) and oblivious transfer. However, the significant computational overhead required by FHE and oblivious transfer makes them not suitable for real-world applications. The disclosed approach involves a particular approach related to secure MPC-based inference systems for neural networks.

Secure MPC is a cryptographic protocol that enables individual parties to perform joint computations (e.g., inference) using their sensitive inputs (e.g., a private model and private data) without revealing the respective inputs to each other. For example, organization one, such as a hospital, could develop a high-performance DL model to detect a specific disease. Organization two, with new patients' data, could use organization's one model to detect the disease in their patients' data by running them through the model (this task is referred to as inference). Generally, to run this inference task either organization one has to share their model with organization two or organization two has to send their data to organization one. However, organization one is unwilling to share their model due to intellectual property concerns and organization two cannot share their patients' data due to privacy and legal concerns. In this scenario, secure MPC inference allows both organizations to collaborate and generate the inference results without having to share neither the model nor the data with each other. MPC was first proposed by Yao, where a constant round protocol allowed two parties to securely evaluate a function on their sensitive inputs.

Secure MPC can enable a neural network (NN) inference to take place between a service provider (also known as a server), such as organization one above, holding a trained proprietary model, and a client device, holding sensitive data for inference, such as organization two above, without revealing neither the model nor the input data. FIG. 1 illustrates a general architecture 100 for a secure inference service between two parties: one holding the model while the other holds some private data. A system 100 is illustrated in FIG. 1 that includes a client device 102 having private data 104, a server or service provider 112 having a proprietary trained model 114 and a cryptographic protocol 108 for receiving via encryption 106 the data 104 from the client device 102 and receiving via encryption 110 the trained model 114. The cryptographic protocol 108 might utilize the trained model 114 to process the private data 104 and return a prediction result to the client device 102.

Such systems start by encrypting 106, 110 both the model 114 and the data 104 and then utilize different techniques, e.g., additive secret sharing, to calculate the inference result over the encrypted inputs and finally reveal the inference results to the client device 102.

While existing MPC-based inference techniques can preserve the privacy of both the model and input data, the majority of the work in this domain still faces two major challenges. The first challenge is that they require intensive computations and communications between the involved parties-leading to impractical execution times, especially for industry usage. This is caused by the underlying implementation of the MPC cryptographic primitives. For example, one of the currently most efficient MPC protocols for NN inference requires 1.16 seconds to run a single image inference (of size 32×32 pixels) on a neural network with two convolutional layers and two fully-connected layers. Thus, there remains a pressing demand to develop new MPC primitives that accelerate NN's inference without harming its accuracy. The second major challenge is that existing MPC inference methods are hard to adopt due to the lack of proper tool support suitable for DL practitioners, who often lack in-depth cryptograph expertise to implement the necessary algorithms and tools themselves. Majority of the existing methods still require their users to be familiar with the underlying cryptographic techniques to utilize MPC inference, which puts them out of reach from most DL practitioners. Thus, MPC-based inference systems for DL models must provide intuitive and practical tool support that does not require MPC-specific expertise.

The goal of secure multi-party computation (MPC) is to enable a group of parties (e.g., data owners) to jointly compute a function that depends on their private inputs without having to trust each other. For example, one approach uses a pre-trained model of one organization to generate predictions from other organization's data.

Formally, secure MPC enables n number of parties, $p_1, \ldots p_n$, each holding some input data $x_{i \in [1 \ldots n]}$ to jointly compute a function $f$ on their private data in a secure way such that no party learns other party's data. There are two main types of MPC implementations: Arithmetic circuits and Boolean circuits. Arithmetic circuits are functions consisting of addition and multiplication operations (also called gates). Polynomials are a good example of arithmetic circuits. Square roots and natural logarithms are not considered arithmetic circuits. Addition gates can be computed at each party (see client device 102 and server provider 112 in FIG. 1) without communication between them, while multiplication gates often require several rounds of communications between the parties. Boolean circuits are a special case of the arithmetic circuits operating in the binary field, consisting of XOR and AND gates only. XOR is faster to compute than AND gates, which are much slower.

The first MPC protocol proposed by Yao used a constant round protocol for two parties to securely evaluate a function on their inputs. However, one of the issues with Yao's protocol relates to its operations on the boolean gate level. While several works tried to address this issue by providing techniques to convert any arbitrary function to its boolean representation, these tools fail to convert more complicated functions, such as those of neural networks (e.g., sigmoid).

To reduce the computational and communication overhead of such protocols, some recent work focuses on implementing the MPC service over two computational phases: (1) A prepossessing phase that is used to compute a majority part of the known multiplication operations and/or AND gates based on the known functionality (e.g., existing model). (2) An online computation phase, which involves the actual computation involving both parties' data (e.g., prediction task). Such implementations focus on optimizing the prepossessing phase to improve the overall computation efficiency. However, this requires the model to be constant. Changing or updating the model requires re-running the preprocessing phase for both the server 112 and the client 102, which constitutes the majority of the computation.

In addition to the challenges introduced by the underlying heavyweight implementations of MPC, most existing work is research-focused and lacks software support. Thus, the adoption of MPC in DL applications is still considerably limited, leading to a pressing demand for automated MPC inference services that enable industry-level DL applications. It is also helpful that these services are usable by DL researchers and developers without background in cryptography. Some tools have recently evolved to address this challenge, including the CrypTen library. However, CrypTen does not support the Windows operating system currently and is limited to DL models developed in TensorFlow. In contrast, the disclosed system or tool exposes an intuitive API that supports all operating systems and DL models developed in TensorFlow, Keras, and PyTorch.

To appropriately address these various issues, disclosed herein is an efficient and automated system for neural network secure MPC inference. The system enables organizations to automatically provide and consume NN prediction services without compromising any of the involved parties' privacy. The system achieves two main goals: (1) it introduces new innovative cryptographic primitives to optimize and accelerate the MPC inference, and (2) it provides an automated, user-friendly, machine learning (ML)-first application programming interface (API) that caters to DL practitioners and non-cryptography experts. Furthermore, the secure MPC approach can technically evaluate any arbitrary algorithm. The system supports prediction for linear and logistic regression models, random forest trees, XGBoost models, private set intersection, secure comparison, and neural networks. Other models could be used by the system as well. It also supports activation functions and layers that are not supported by other existing inference protocols, including sigmoid, tan h, recurrent neural networks (RNNs), long-short term memory (LSTM), pooling, and batch normalization.

The main contributions of this disclosure include the new efficient algorithms (also referred to as primitives) and automated tool support for secure MPC for neural network's inference. The disclosure provides the underlying innovative cryptographic primitives that enables the new system, such as a new comparison primitive that supports both two-party and three-party computation configuration. Another contribution is an industry-scale software system with an automated, ML-first, user-friendly API for remote secure inference. Another contribution includes a suit of experiments to evaluate and contrast the disclosed inference protocol to current related work.

To evaluate the performance of the new system, the inventors ran several experiments using five different NNs with different architectures, including convolutional neural networks (CNNs), fully-connected networks, LeNet5, and VGG-16 using MNIST and CIFAR-10 datasets. Those of skill in the art will understand and have access to these various networks and datasets. The results illustrate that the disclosed approach achieves better results than the current state-of-the-art NN inference methods, including MiniONN, Gazelle, Chameleon, SecureNN, Blaze and Quotient. Again, those of skill in the art will be aware of these current secure MPC methods and their usage.

The rest of the disclosure is organized as follows. There is a brief overview of secure MPC and its implementation methods. Next the disclosure presents the innovative cryptographic primitives and their protocols which are utilized in the NN inference system. Then, the disclosure explains in detail the implementation of the NN inference techniques. The disclosure also provides a security proof of the primitives. Further, the disclosure presents an analysis on the execution time of the secure MPC inference. A discussion of primitives is next followed by a discussion of FIG. 2 that presents an overview of the inference software system.

MPC Primitives

The proposed system includes underlying cryptographic primitives and next is discussed the implementation of each primitive, and then their round and communication complexity.

Threat Model

Figure 2:
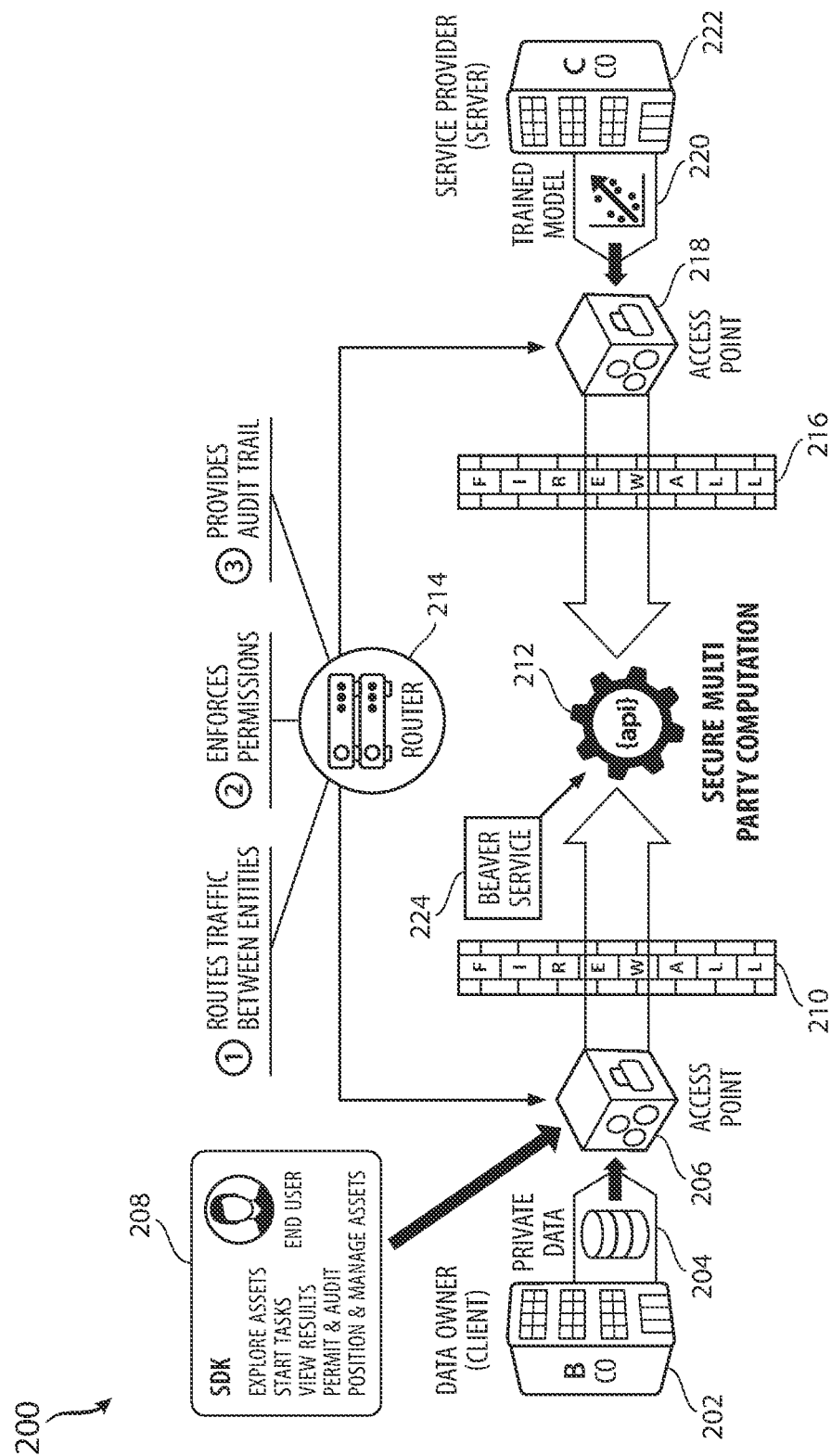
FIG. 2 illustrates various components for a secure inference service available to data providers and model providers according to some aspects of this disclosure.

As shown in FIG. 2, consider a system 200 in which two parties who wish to jointly compute a prediction function: one party 222 holds the model 220 (known as server or service provider 222) while the other 202 holds the input data 204 (known as the client or client device). However, both parties are unwilling or unable to compute the prediction in plain text. To enable the disclosed secure MPC, both parties use the provided system by installing the software package in their own computing machines (on premise or on the cloud)—those machines are referred to as access points and represented by 206 for the client 202 and represented by 218 for the server 222. To use the system after installation, the client positions their private data 204 into its access point 206 and the server positions its trained model 220 into its access point 218. In addition, there is a third trusted party 224 (also referred to as $u_3$) in the setup, which can be a slim web server responsible for generating the necessary Beaver triples, as explained below. The client can also be referred to as $u_1$ and the server can be presented by $u_2$. The system 200 operates in a semi-honest setting, in which an adversary tries to learn as much information as possible about the other party's private data but never deviates from the protocol.

The approach disclosed herein can also enforce an agreement phase before the computation begins, in which both parties decide on the task, input data, the results to disclose, policies around the task, and a payment agreement for monetization purposes, if applicable. This agreement can be presented and agreed to by each party prior to any data or model being made available to the system.

During a preprocessing stage, participants (i.e., client 202, $u_1$, and server 222, $u_2$) may jointly generate common seeds. In one example, a trusted third party (224, $u_3$) does not generate the common seeds between users. The trusted third party (224, $u_3$) is not allowed to know the common seed between them. The trusted third party (224, $u_3$) can generate in one example the common seed between $u_1$ and $u_3$ and between $u_2$ and $u_3$ but not between $u_1$ and $u_2$. In this manner, the trusted web server 224, $u_3$, generates these common seeds between itself and the other parties and distributes them to the involved parties 202, 222.

The disclosed cryptography primitives also require an encoding and a decoding stage in which the inputs to all of the functions, which are explained in more detail below, must in one example be integers, matrices, or vectors with integer elements. Thus, the system encodes all inputs, including the private data 204 and the proprietary trained model 220 inside the system's access points 206 and 218 corresponding to the client 202 and the server 222, respectively. To do the encoding, the system multiplies the input by an encoding factor f and uses the closest integer as the encoded value. In the following functions, we assume the inputs are already encoded into integers. Similarly, when the final result is computed using one of the primitives, the value is decoded back into a float value using the same encoding factor f.

The following explains in detail the underlying implementation of the proposed cryptographic primitives. For each primitive (also referred to as a function or algorithm), the disclosure first explains the required input under the subtitle (Inputs), the expected output of the function under the subtitle (Outputs), and the algorithm steps. Some of the algorithms are also followed by a brief discussion for their security or correctness.

A share generation stage as part of the process can include a function that exists on each party 206, 218 to generate two uniformly random shares over the ring of the party's data, as follows.

ShareGeneration (a,R):
Inputs: A Pseudo Random Generator PRG(S, n, R), where S is the seed, and the output is n random numbers over R. User 1 (e.g., the client 202 inside the device 206), denoted $u_1$, provides integer a and user 2 (e.g., the service provider 222 operating from within access point 218), denoted $u_2$, is supposed to receive the additive share of a. Let seed S* be a common seed and ring R* be known to both parties $u_1$, $u_2$.
Output: $u_i$ receives $a_i$ for i={1, 2} such that $a_1+a_2=a$
The ShareGeneration algorithm proceeds in the following steps (protocol):
(1) $u_1$, computes $a_1$=a-PRG S*,1, R*
(2) $u_2$ computes $a_2$=PRG S*,1, R*

It is clear that $a=a_1+a_2$ and $u_2$ doesn't learn anything from a as nothing is shared with the other party. Hence, the ShareGeneration algorithm leaks no information.

In an addition stage of the process, the system can use an addition function. In this stage, the two parties 202, 222 can add two secret values that they own, a and b, and receive the addition result without knowing each other's input. Similar to all algorithms disclosed in this document, all computations take place between the parties' access points directly, that is between access points 206 and 218. The Addition algorithm is explained in the following.

ADD (a, b)
Inputs: User $u_1$ holds ($a_1$, $b_1$) and user $u_2$ holds ($a_2$, $b_2$).
Output: $u_i$ receives $c_i$ such that $c_1+c_2=a+b$
The ADD protocol is defined as follows:
(1) for i={1, 2}$u_i$ computes $c_i=a_i+b_i$ To compute a secure multiplication, the system 200 uses Beaver triplets generated by a secure server 224. The multiplication process for different values, including integers and matrices, is explained next.

First, we detail the integer multiplication Mult(a,b) as follows.

---

Inputs: A Pseudo Random Generator PRG (S, n, R), where S is the seed, $S_{ij}$ is the seed between $u_i$ and $u_j$, and the output is n random numbers over R. User $u_1$ holds $a_1$, $b_1$, $S_{13}$ and user $u_2$ holds $a_2$, $b_2$, $S_{23}$, and $u_3$ holds $S_{13}$ and $S_{23}$.
Output: $u_i$ receives $c_i$ such that $c_1 + c_2 = ab$
Protocol:
(1) $u_1$ computes $p_1, q_1, w_1$ = PRG ($s_{13}$, 3, $Z_{2^{64}}$)
(2) $u_2$ computes $p_2, q_2$ = PRG ($s_{23}$,3, $Z_{2^{64}}$)
(3) $u_3$ computes $p_1, q_1, w_1$ = PRG ($s_{13}$, 3, $Z_{2^{64}}$) and $p_2, q_2$ = PRG ($s_{23}$, 2)
(4) $u_3$ computes $w_2 = (p_1 + p_2)(q_1 + q_2) - w_1$ and sends it to $u_2$
(5) $u_1$ computes $a_{m_1} = a_1 - p_1$ and $b_{m_1} = b_1 - q_1$ and sends $a_{m_1}$, $b_{m_1}$ to $u_2$
(6) $u_2$ computes $a_{m_2} = a_2 - p_2$ and $b_{m_2} = b_2 - q_2$ and sends $a_{m_2}$, $b_{m_2}$ to $u_1$
(7) $u_1$ and $u_2$ computes $a_m = a_{m_2} + a_{m_1}$ and $b_m = b_{m_2} + b_{m_1}$
(8) $u_1$ computes $c_1 = a_m q_1 + b_m p_1 + w_1 + a_m b_m$
(9) $u_2$ computes $c_2 = a_m q_2 + b_m p_2 + w_2$

---

The following illustrates the correctness of the above multiplication protocol. In other words, the system proves that $c_1+c_2==ab$ is indeed the correct output of the multiplication.

$$c_1+c_2=a_m(q_1+q_2)+b_m(p_1+P_2)+w_1+w_2+a_m b_m$$

$$c_1+c_2=a_m q+b_m p+w+a_m b_m$$

It is known that by construction w=pq hence:

$$c_1+c_2=(a_m+p)(b_m+q)$$

and the system knows that $a_m$=a−p and b−q hence:

$$c_1+c_2=ab$$

Next is discussed an element-wise multiplication process ElementWiseMult(a, b):

---

Inputs: A Pseudo Random Generator PRG (S, n, R), where S is the seed and $S_{ij}$ is the seed between $u_i$ and $u_j$, and the output is n random numbers over R. User $u_1$ holds two vectors of size m, $a_1$ and $b_1$, a common seed $S_{13}$ and user $u_2$ holds $a_2$, $b_2$ (size m) and a common seed $S_{23}$. $u_3$ holds $S_{13}$ and $S_{23}$, a socket is used for communication between $u_1$, $u_2$ and a socket is used for communication between $u_2$ and $u_3$.
Output: $u_i$ receives vector $c_i$ of size m such that $c_1 + c_2$ = element wise mult(a, b).
Protocol:
(1) $u_1$ computes $B_1$, an m by 3 matrix, such that $B_1$ = PRG($S_{13}$, 3m, $Z_{2^{64}}$)
(2) $u_2$ computes $B_2$, an m by 2 matrix, such that
$B_2$ = PRG($S_{23}$, 2m, $Z_{2^{64}}$))
(3) $u_3$ computes the following
$B_1$ = PRG($S_{13}$, 3m, $Z_{2^{64}}$)) and
$B_2$ = PRG($S_{23}$, 2)
Note: $B_1$[, i] stands for the $i_{th}$ column of matrix $B_1$ -continued (4) $u_3$ computes $b_{2_3} = (B_1 [, 0] + B_2 [, 0]) (B_1 [, 1] + B_2 [1] - B_1[, 2]$ and sends the results to $u_2$ and then $u_2$ concatenates this column to $B_2$
(5) $u_1$ computes
$a_{m_1} = a_1 - B_1[, 0]$ and
$b_{m_1} = b_1 - B_1[,1]$ and sends $a_{m_1}, b_{m_1}$ to $u_2$
(6) $u_2$ computes
$a_{m_2} = a_2 - B_2[,0]$ and
$b_{m_2} = b_2 - B_2[,1]$ and sends $a_{m_2}, b_{m_2}$ to $u_1$
(7) $u_1$ and $u_2$ compute
$a_m = a_{m_2} + a_{m_1}$ and
$b_m = b_{m_2} + b_{m_1}$
(8) $u_1$ computes
$c_1 = a_m B_1[,1] + b_m B_1[,0] + B_1 [,2] + a_m b_m$
(9) $u_2$ computes
$c_2 = a_m B_2[,1] + b_m B_2[, 0] + B_2 [, 2]$ Next is discussed a matrix multiplication approach MatMult(a, b).

Inputs: A Pseudo Random Generator PRG(S, n, R), where S is the seed, and the output is n random numbers over R. User $u_1$ holds two matrices $a_1$ and $b_1$ with size (z, w) and (w, v) respectively, and a common seed $S_{13}$ and user $u_2$ holds $a_2$ and $b_2$ with size (z, w) and (w, v) and a common seed $S_{23}$. $u_3$ holds $S_{13}$ and $S_{23}$, a socket is used for communication between $u_1$, $u_2$ and a socket is used for communication between $u_2$ and $u_3$. ($a = a_1 + a_2$, $b = b_1 + b_2$)
Output: $u_1$ receives matrix $c_1$ of size (z, v), such that $c_1 + c_2 = a*b$
(* denotes matrix multiplication).
Protocol:
(1) $u_1$ computes beaver list $b_{l_1} = [B_1 1, B_1 2, B_1 3]$: such that their shapes are (z, w) (w, v) (z, v) respectively
$B_1 1 = PRG (S_{13}, zw, Z_{2^{64}})$
$B_1 2 = PRG(S_{13} + 1, wv, Z_{2^{64}})$
$B_1 3 = PRG(S_{13} + 2, zv, Z_{2^{64}})$
(2) $u_2$ computes beaver list $b_{l_2} = [B_2 1, B_2 2]$: such that their shapes are (z, w), (w, v) respectively
$B_2 1 = PRG(S_{23}, zw, Z_{2^{64}})$
$B_2 2 = PRG(S_{23} + 1, wv, Z_{2^{64}})$
(3) $u_3$ computes
$B_1 1 = PRG(S_{13}, zw, Z_{2^{64}})$
$B_1 2 = PRG(S_{13} + 1, wv, Z_{2^{64}})$
$B_1 3 = PRG(S_{13} + 2, zv, Z_{2^{64}})$
$B_2 1 = PRG(S_{23}, zw, Z_{2^{64}})$
$B_2 2 = PRG(S_{23} + 1, wv, Z_{2^{64}})$
(4) $u_3$ computes $B_2 3 = (B_1 1 + B_2 1) * (B_1 2 + B_2 2) - B_1 3$ and sends it to $u_2$ and $u_2$
(5) $u_1$ computes $a_{m_1} = a_1 - B_1 1$ and $b_{m_1} = b_1 - B_1 2$ and sends $a_{m_1}, b_{m_1}$ to $u_2$
(6) $u_2$ computes $a_{m_2} = a_2 - B_2 1$ and $b_{m_2} = b_2 - B_2 2$ and sends $a_{m_2}, b_{m_2}$ to $u_1$
(7) $u_1$ and $u_2$ computes $a_m = a_{m_2} + a_{m_1}$ and $b_m = b_{m_2} + b_{m_1}$
(8) $u_1$ computes $c_1 = a_m * B_1 2 + B_2 1 * b_m + B_1 3 + a_m * b_m$
(9) $u_2$ computes $c_2 = a_m * B_2 2 + B_2 1 * b_m + B_2 3$ In a division stage, in order to compute a secure division operation, the system first needs to compute the reciprocal of the denominator. The system can use a Newton-Raphson approach to compute the reciprocal. The following sequence gives us an approximation of the reciprocal x:

$$x_{i+1} = x_i(2 - ax_i), \text{ where } 0 < x_0 < 2/a$$

The protocol may need to guess $x_0$. If the system has no information about x, it would be rather difficult to compute the reciprocal, but in some cases, like in sigmoid and tan h functions, the system can select a good $x_0$. The division function is explained in the following.

Div(a, b)

Inputs: User $u_1$ holds $a_1$, $b_1$, $x_0$, n and user $u_2$ holds $a_2$, $b_2$, $x_0$, n. where n is the desired precision that the system wants to compute the division with, and $f$ is the encoding factor.

Output: $u_1$ receives $c_1$ such that $c_1 + c_2 = f\left(\left\lfloor\frac{a}{b}\right\rfloor\right)_{b\rfloor}$ Protocol:
(1) $u_1$ computes $x_{1_1} = x_0(2 - a_1 x_0)$
(2) $u_2$ computes $x_{1_2} = x_0 (-a_2 x_0)$ Type equation here.
(3) for $1 \leq j < n$, $u_1$ computes $x_{(j+1)_1} = \text{Mult}(x_{j_1}, 2 - \text{Mult}(x_{j_1}, a))$
(4) for $1 \leq j < n$, $u_2$ computes $x_{(j+1)_2} = \text{Mult}(x_{j_2}, -\text{Mult}(x_{j_2}, a))$
(5) $u_i$ computes $c_i = \text{Mult}(a, x_{n_i n})$ Another stage can include the use of exponential functions. In order to calculate exponential functions, the system uses the limit approximation. That is, $$\exp a = \left(1 + \frac{a}{2^n}\right)^{2^n}.$$

The system can use the default value 10 for n, so each party needs to compute $$\left(1 + \frac{a}{2^n}\right)$$

and multiply it to itself using the MPC multiplication protocol n times. The exponent function can be explained in the following:

Exp (a)

Inputs: User $u_i$ holds $a_i$, n, $f$ and user $u_2$ holds $a_2$, n, $f$, where $f$ is the encoding and decoding factor. n is the desired precision that we want to compute the exponential with.

Output: $u_i$ receives $c_i$ such that $c1+c2=\lfloor f \cdot \exp(a/f) \rfloor$.

For illustrative purposes, assume the original value to compute the exponential is 0.322 and $f=1000$, so after encoding, the system has $a=a_1+a_2=323$. It is known that $e^{0.323}=1.38126$. The system will want to compute $c_1, c_2$ such that $$c1+c2=1381=\lfloor f \cdot \exp(a/f) \rfloor.$$

Another stage can include a comparison function. One of the innovative contributions in this disclosure is the comparison function, which supports both 2-party and 3-party computation setups. The underlying idea of the secure comparison function is to binarize the subtraction shares over $Z_{2^{64}}$ and then add binary shares over $Z_2$ (after the binarization) using a binary Adder and check the most significant bit (MSB) of the result. This idea could be used if the MPC modulus is a power of 2.

This disclosure can apply both Ripple Carry Adder requiring n rounds of communications for n bit numbers and Brent Kung Adder requiring log(n) round of communications. The comparison function can be explained in the following.

```
Comp(a b mode)
Inputs: User u_1 holds a_1, b_1 and user u_2 holds a_2, b_2.
Output:
if mode = 1: u_i receives c_i such that c_1 + c_2 = a > b
if mode = 0:
(1) if a ≥ b: u_i receives c_i such that c_1 + c_2 = a
(2) if b > a: u_i receives c_i such that c_1 + c_2 = b
Protocol:
(1) u_i binarizes (m_i = a_i − b_i) and generate 64 binary values, such that,
m_{i_b} = m_{i_{64}} m_{i_{63}} m_{i_{62}} ... m_{i_1}
for all 1 ≤ j ≤ 64, m_{i_j} ∈ {0,1}
(2) for all 1 ≤ j ≤ 64, u_i runs ShareGeneration(m_{i_{j_1}}, Z_2)
(3) u_i evaluates the adder circuit (ripple carry) or (Brent Kung)
and compute d_{i_j} such that for all 1 ≤ j ≤ 64:
d_{1_j} + d_{2_j} = d_j this sum is over Z_2 (xor) and
d_{64}d_{63} ... d_1 = m
it is needed to check the 64^{th} bit of d to learn if a ≥ b
(4) u_i runs ShareGeneration(d_{i_{64}}, Z_{2^{64}}) and computes:
r_i = Add (d_{1_{64}}, d_{2_{64}}) − 2Mult(d_{1_{64}}, d_{2_{64}})
In this step the system converts the shares from Z_2 to Z_{2^{64}}
(5) if mode = 1 , u_1 returns c_1 = 1 − r_1 and u_2 returns c_2 = r_2
(6) if mode = 0, they compute:
c_i = ADD(Mult(1 − r, a), Mult(r, b)
```

Table 1 illustrates the round and the communication complexity of the above defined protocols, including element wise multiplication for two vectors of the size v, matrix multiplication of two matrices of sizes (z, w), (w, v). In the table, n denotes the desired output precision while l denotes the number of the bits in the data.

TABLE 1

Primitives Round and Communication complexity

| Primitive | Round | Complexity |
| --- | --- | --- |
| Share Generation | 0 | 0 |
| Element Wise multiplication | 1.5 | 3vl |
| Matrix Multiplication | 1.5 | (zv + 2zw + 2wv)l |
| Addition | 0 | 0 |
| Division | Zn + 1.5 | (4n + 3)l |
| Exponential | n + 0.5 | (2n + 1)l |

This disclosure next presents innovative implementations to evaluating neural network's (NN) inference using secure MPC based on the cryptographic algorithms introduced above. The disclosed secure MPC algorithms and system supports deep learning models built in TensorFlow, Keras, PyTorch, ONNX, and other similar systems. Moreover, the disclosed innovation supports a wide range of NN's layers and functions that are not supported by other existing work, including the functions of RNN, LSTM, pooling, sigmoid, tan h, batch normalization, and others.

A neural network is denoted as D and its n layers as $\{l_1, l_2 \ldots l_n\}$. Given input x, a NN can be represented as a function composition of its layers, such as $D(x)=l_n(\ldots l_2(l_1(x)))$. To use secure MPC for NN inference, i.e., evaluating the NN layer by layer, the disclosed system first converts each layer either to an arithmetic circuit or to its equivalent Boolean circuit, based on the layer's underlying operations.

In particular, to securely compute the inference result, the automated system first extracts the model's weights and other parameters (e.g., the filter size, pool size) as well as the structure of the model at the service provider side (depicted in 218 of 222 in FIG. 2). Then, using the ShareGeneration function, the system generates two shares of the model's weights W (i.e., $W_1, W_2$). Similarly, the tool generates two shares (i.e., $D_1, D_2$) from the input data D, located at the client 202 access point 206 depicted in FIG. 2.

Then, each user exchanges one of their shares with the other user. For example, the server (assume being user 1, $u_1$) sends the share Wi to the client (user 2 in this scenario, $u_2$). The client also sends one of their shares to the server. Then, based on the underlying function, the system carries out the inference one layer at a time. Following is discussed the implementation of different layers and functions.

Fully connected and convolutional layers: Fully-connected layers are computed using the MatMult algorithm defined above since this layer is exactly a matrix multiplication. Similarly, the system can calculate the convolutional layer as large matrix multiplication by expressing the convolution function as matrix multiplication between the convolution and kernel parameters. The following figure demonstrates an example for rearranging the convolution function into a matrix multiplication (x and k denote the input values and the kernel parameters, respectively):

$$Conv2D\left(\begin{bmatrix} x_1 & x_2 & x_3 \\ x_4 & x_5 & x_6 \\ x_7 & x_8 & x_9 \end{bmatrix} \cdot \begin{bmatrix} k_1 & k_2 \\ k_3 & k_4 \end{bmatrix}\right) = \left(\begin{bmatrix} x_1 & x_2 & x_4 & x_5 \\ x_2 & x_3 & x_5 & x_6 \\ x_4 & x_5 & x_7 & x_8 \\ x_5 & x_6 & x_8 & x_9 \end{bmatrix} * \begin{bmatrix} k_1 \\ k_2 \\ k_3 \\ k_4 \end{bmatrix}\right)$$

The depth of the multiplication in this layer is one. Thus, the system can perform all the multiplications in parallel to reduce the number of rounds of communications to 1, even for batch evaluation, which further improves the efficiency of the protocol.

Maximum pool layer: The system uses the compare function to evaluate the maximum pool layer. To find the maximum of two inputs a, b, each party needs to run Compare(a,b,0), which returns the maximum value without revealing it to any party. So, assuming that the comparison function needs k rounds of communications and the max pool filter size is N×N, the system can perform MaxPool2D with $k\lceil \log_2(N^2) \rceil$ rounds of communications. This means that the system can perform a 2×2 max pooling in 2 k rounds of communications.

Batch normalization layer: the system can compute the batch normalization layer for an input x using the formula:

$$\frac{x - E(x)}{\sqrt{Var[x] - \epsilon}} X\gamma + \beta,$$

where E(x) is the average, V ar [x] is the variance, γ and β are the scale factor and the bias (trainable parameters), and the system uses $\epsilon = 0.001$. Other values and formulas are contemplated as well. Besides the square root part and the division, this layer could also be considered as an arithmetic layer. During preprocessing, the model owner computes the square root of the variance minus epsilon and sends the share of the square root to the data owner.

ReLU: For the rectified linear unit, which outputs the input directly if positive or outputs zero otherwise, the system can use the comparison function to compute the output of the ReLU activation function. For each input a, each party can run Compare (a, 0, i).

Sigmoid: The system can approximate the exponential part using the limit approximation approach and then can compute the sigmoid function directly using the following equation when the given value is in the range [−3.6ƒ, 3.6ƒ] where ƒ is the encoding factor.

sig(x)=Div(1,1+exp(−x))

If the value of x>3.6ƒ the system outputs 1; if x<−3.6ƒ the system outputs 0. The above division function is our encrypted division function defined above.

Tan h: Given that the function tan h can be expressed using sigmoid, the system can utilize the following equation to calculate tan h, where sigmoid can be calculated as defined above:

tan h(x)=2(Sigmoid(2x))−1

The long-short term memory (LSTM) layer: Given the fact the LSTMs are mainly made of sigmoid and tan h functions, existing solutions rarely provide efficient and accurate solutions since their underlying MPC implementation of these functions are bad approximations. However, as disclosed above, the system can provide efficient and accurate implementations for both sigmoid and tan h functions, and, therefore, the system can accurately evaluate LSTM layers, as explained in the following.

In the disclosed system, it can calculate LSTMs as follows:

$i_t$=sigmoid($M_{it}x_t+b_{it}+W_{ht}h_t+b_{hi}$)

$f_t$=sigmoid($W_{if}x_t+b_{if}+W_{hf}h_{t-1}+b_{hf}$)

$g_t$=tan h($W_{ig}x_t+b_{ig}+W_{hg}h_{t-1}+b\ hg$)

$o_t$=sigmoid($W_{io}x_t+b_{io}+W_{ho}h_{t-1}+b_{ho}$)

$c_t=f_t \times c_{t-1}+i_t \times g_t$ $h_t=o_t \times \tan h \tan h(c_t)$ where, $h_t$, $c_t$, $x_t$ are the hidden state, cell state, and the input at time t respectively and $h_{t-1}$ is the hidden state of the layer at time t−1

$i_t$, $f_t$, $g_t$, $o_t$ are the input, forget, cell, and output gate respectively. X is the Hadamard product.

The disclosed protocol provides full security and correctness against corruption of the semi-honest users and any subset of them. And it is also secure against single malicious user. Given the perfect security definition, the disclosed MPC protocol fulfills the perfect security requirements:

$P[M=m_0|C=c_0]=[M=m_1|C=c_0]$.

In other words, the cipher doesn't reveal any information about the message. In this implementation, M is the original data belonging to one of the users ($u_i$) and C is the share sent to other parties. To meet the perfect security definition, the system needs to make sure that the share received by other party does not reveal anything about the original data, using the ShareGeneration function. Given a cipher, the probability of the original data being $m_0$ is equal to the probability of the original data being mi.

To meet perfect security, it is important that the Pseudo Random Generator samples from the space with size equal to the size of the original data space. This means the disclosed protocol is secure against any cipher attack. Regardless of the computational power of the adversary (even quantum computers), the adversary cannot derive any information from the cipher (share in this case). Intuitively, it is clear that shares are independently generated from the original data.

Perfect security doesn't guarantee the correctness and data privacy in the presence of a malicious party. The disclosed MPC can be a semi-honest protocol which generates the correct result and data privacy if all parties follow the protocol. Although, if only one of the parties does not follow the protocol, they cannot compromise the data privacy but they can corrupt the final result. The service 224 ($u_3$) can corrupt the result by generating wrong beaver triples and compromise the data privacy by colluding with either $u_1$ or $u_2$. The user $u_1$ and $u_2$ also can corrupt the result by not following the steps and wrong inputs and they can compromise data privacy by colluding with $u_3$.

Next is discussed an execution time analysis. This disclosure sheds light on the execution time of the protocol compared to the current state-of-the-art methods of secure MPC. An experiment on a laptop with a 2.60 GHz Intel Core-i7 processor and a 16 GB of RAM running Linux version 19.10 was performed. The experiment included running an inference using a pre-trained NN using our secure MPC inference protocol, which is made of the algorithms disclosed above. The inference protocol was evaluated on different NN with the following architectures:

(1) Network-A: 3-layer fully-connected network with ReLU activations after each layer. Network-A can be trained on the MNIST dataset.
(2) Network-B: one convolution layer followed by two fully-connected layers and ReLU activations. Network-B can be trained on the MNIST dataset.
(3) Network-C: 4-layer network with two convolution layers and two fully-connected layers with max pooling and ReLU. Network-C can be trained on the MNIST dataset.
(4) LeNet: two convolution layers and two fully connected layers. LeNet can be trained on the MNIST dataset.

(5) VGG-16: a well-defined NN with a deep architecture. VGG-16 can be trained on the CIFAR-10 dataset.

Table 2 lists the results of the execution time in seconds of the disclosed approach compared to five other methods, including SecureNN, Gazelle, Min-iONN, and Chameleon (with a smaller network of the shape 1 convolution+2 fully-connected layers). Those of skill in the art will understand these other methods.

TABLE 2

Execution time comparison using different secure MPC methods for an inference task over a LAN

| Approach | New System | SecureNN | Gazelle | MiniONN | Chameleon |
|---|---|---|---|---|---|
| Network-A | 0.039 | 0.043 | 0.09 | 1.04 | 1.36 |
| Network-B | 0.064 | 0.076 | 0.29 | 1.28 | — |
| Network-C | 0.11 | 0.13 | 1.16 | 9.32 | — |
| LeNet | 0.21 | 0.23 | 0.33 | 5.74 | 2.7 |
| VGG-16 | 2.56 | — | — | — | — |

The experiment results illustrate that the disclosed approach is relatively efficient. SecureNN uses a 3-party setup algorithm for ReLU and Private Compare so technically they cannot convert their protocol into 2-party configuration. The advantage of the disclosed protocol over SecureNN is that the system can switch to 2-party computation by learning with errors (LWE)-based Beaver Triple Generation. This disclosure also illustrates some of the major differences among these methods based on the supported layers and functions. The lack of support for specific layers and functions can drastically reduce the model's accuracy. Table 3 illustrates that the presented approach outperforms the current approaches by supporting additional layers for NN, including division, sigmoid, batch normalization, and LSTM.

TABLE 3

Comparison of the supported layers and operations among the state-of-the-art secure MPC methods.

| | New System | SecureNN | Gazelle | MiniONN | Chameleon |
|---|---|---|---|---|---|
| Convolutional | ✓ | ✓ | ✓ | ✓ | ✓ |
| Linear | ✓ | ✓ | ✓ | ✓ | ✓ |
| ReLU | ✓ | ✓ | ✓ | ✓ | ✓ |
| Max pool | ✓ | ✓ | ✓ | ✓ | ✓ |
| Batch normalization | ✓ | — | — | — | — |
| Division | ✓ | ✓ | — | — | — |
| LSTM | ✓ | — | — | — | — |

The following is an overview of the disclosed system as shown in FIG. 2. At a high level, the system 200 focuses on developing an end-to-end solution for privacy-enhancing technology that enables advanced analysis, training, and inference for decentralized data over the cloud or any network. The solution can be characterized as "tripleblind" because none of the involved parties can "see" others' data, including the server 222, client device 202, router 214, Beaver service 224, or other system. The overview of the system architecture encompasses three major parts: the router 214, one or more access points 206, 218 and a software development kit (SDK) 208. In one aspect, the router 214 is a centralized system which allows browsing the metadata of shared assets, coordination, orchestration and validation of joint operations between the parties. The router 214 can also provide an audit of operations. The SDK 208 provides instructions and libraries to interface with an application programming interface 212 as disclosed herein. An asset can be a digital file, a collection of digital files or other structure of data or models that belong typically to a single party. In another example, a data asset can represent data records, such as database rows, image files, or other digital representations of information.

FIG. 2 also discloses an optional beaver service 224 which can provide the ability of a third party other than the first and second parties 202, 222 to pre-compute beaver sets and cache them in anticipation of future requests as part of the secure multi-party computation.

In one aspect, the "system" may include any individual node or computing device in the overall system 200. For example, the router 214 can be characterized as providing a secure inference service for other parties 202, 222. To provide this service, the router 214 may manage routing traffic between the parties 202, 222, where such traffic takes place between the parties' access points directly 206 and 218 without passing through the router 214. The router 214 also enforces permissions and provides an audit trail for the process and result. The router 214 can also manage an application programming interface 212 that is made available to the parties 202, 222 to discover each others' available assets in order to perform the secure multi-party computation inference.

The secure inference service occurs between two parties: the server's 222 access point 218 that holds a trained model 220 for some prediction task and a client's 202 access point 206 with some private data 204 that wants to use it for prediction. The model 220 can represent an algorithmic asset that represents an operation which can be performed on a data asset or the private data 204. This could be a trained machine learning model, a procedural program or other well-known operations. Using the system disclosed herein, both parties 202, 222 can jointly run the input data 204 in the model 220 to generate the inference results without harming their privacy and all computations generate and are exchanged between the party access points directly (i.e., 206 and 218). To use this service, each party 202, 222 installs software system as a docker container on their cloud or local machines. The local machine in this case is referred to as an access point 206, 218. Thus, the client has an access point 206 running the SDK 208 and the service provider 222 also will have an access point 218 running the SDK.

Using the SDK 208, the involved parties 202, 222 can use the automated APIs 212 to run prediction tasks and audit the process. The router 214 (only) facilitates the management and initiation of the tasks and does not "see" any of the parties' data. The data never leaves any parties' firewalls 210, 216.

An access point (AP) 206, 218 is a docker container running software system within a dedicated machine inside the organization's (user) infrastructure. Note that the access points 206, 218 are both with the respective firewalls 210, 216. The APs 206, 218 are used to host the organization's assets (i.e., data 204 and algorithms or models 220) and connect the organization to the ecosystem via the APs 212. In one example, the AP 206, 218 can be a software component such as docker instance or other software module that runs on the infrastructure of each party.

The AP 206, 218 has a feature relates to its ability to utilize the user's assets on-site and run the secure inference services on them without sending the user's data 204, 220 outside its infrastructure. APs 206, 218 of different parties interact with each other directly using secure channel communications, which are managed by the router 214 but take place between the involved parties directly and never pass through the router 214. The APs 206, 218 can, for example, use an SQLite database, one type of databases to store and manage data, to store and manage their status and the running jobs, and use Flask, a library written in the Python programming language to manage web frameworks, to facilitate and manage the communications with the router 214.

The router 214 is the primary management unit of the ecosystem, deployed as a cloud service responsible for managing and coordinating the users, jobs (i.e., secure MPC inference), communications, permissions, and digital rights. Permission is the affirmative approval of one party to another party allowing use of an asset (data or algorithmic) owned by the first party. The router 214 exposes a set of public APIs 212 for coordinating the joint operations and a web user-interface (web-UI) for other management tasks associated with asset listings. The web UI also allows users to browse and explore information about the assets they wish to index for monetary, collaboration, or research purposes. For example, some organizations can list information about their trained models on the web-UI for discovery by others and allow other organizations to benefit from them by running secure inference jobs using such models.

In one aspect, the system uses JSON Web Tokens (JWT) for the authentication and authorization of the communications between AP-to-router, SDK-to-AP, and AP-to-AP. Other security protocols could be used as well. Communications between the involved parties 202, 222 can be carried out using the encrypted communication protocol, HTTPS and the Secure Socket Layer (SSL) can be used to verify the authenticity of all parties in the ecosystem and to encrypt the communications between them.

The router 214 in one aspect can use the PostgreSQL database to store, organize, and manage the indexed assets, permissions, agreements, jobs, and organizations' accounts. PostgreSQL is an open-source relational database management system. This type of database at the router 214 is not intended to be restrictive, as the system could use any other type of databases, such as graph databases. Indexed assets are managed by the owner organization either via a web-UI or the SDK 208. In one example, an agreement can include a codification of rules which can be used to determine whether a usage of assets should be granted permission. Metadata about the assets (their name, size, location, etc.) can be stored in the router's database (not shown), while the actual raw data of the assets remain at the owner's AP 206, 218 at all times. The router's web-UI can be built using React, an open-source javaScript library. The back-end of the router 214 can be built using Django, a Python web framework. To enable the router APIs 212, the Django REST framework can be used by way of example. Each of these protocols or approaches is described by way of example and those of skill in the art will understand different ways of programming and connecting the various components shown in FIG. 2.

The SDK 208 can provide complete scripting control of the secure inference services, including the secure MPC inference, for the end-user. The SDK 208 can be installed on the end user's device (e.g., a data scientist's workstation) to manage the organization's assets or operate on other organizations' assets for training, inferences, or analysis. The SDK 208 supports Python, R, and provides command-line utilities to interface with the rest of the ecosystem.

The use of the SDK 208 and secure inference API 212 for an end-to-end inference example is discussed next. The following is an example of a secure inference workflow. Assume Hospital A holds a proprietary DL model 220 to detect pediatric pneumonia in chest X-rays. Hospital A wishes to enable other parties 202 to use their model for inference tasks, but do not want to reveal their model 220. At the same time, Hospital B wants to use an automated service to diagnose pediatric pneumonia in chest X-rays since it does not have enough data or expertise to build their own DL model. They also cannot share their patients' chest X-rays (i.e., private data 204) with other healthcare parties that can diagnose pediatric pneumonia due to HIPAA regulations.

Using the system, Hospital A can easily enable usage of their model 220 with the rest of the world without compromising its privacy or having to send it to any party including the system disclosed herein. Simply, Hospital A downloads the system and uses the SDK 208 to list their model on the web-UI. This process only declares the existence of such a model to other users and never uploads the model 220 to a third-party server. The term asset positioning can refer to providing the notice of the existence of the model and what it does so that others can select the model 220 to process some of their data 204. Asset positioning may involve the model being stored at the server's AP 218. The service automatically makes the model 220 consumable by other parties 202 for secure MPC inference.

Now that a pediatric pneumonia model 220 is available for inference, Hospital B 202 can learn this information from a web-UI and then use the SDK 208 to start a secure inference job. FIG. 3 illustrates example code 300 to run a secure MPC prediction task. In this example, the user is indexing other party's model 220 using its public ID (Line 6), which can be obtained from the web-UI. Lines 9 to 17 of the example code 300 describe the actual inference job. Line 11 indicates the model 220 to be used for the inference. Line 12 identifies the input to the secure inference service. Note that the protocol supports batches of input data. Line 13 specifies several example inference parameters, including the type of security to be used (i.e., secure MPC), the used data type, and the input data shape. Other parameters can be used as well and any one or more parameters can be input as part of the process. A successful job will return the inference results with several metadata about the job, as shown in Line 23. The reference to "tb" is an alias for a tripleblind library used in the SDK 208. Thus, line 1 can mean to tripleblind as tb or a tripleblind library.

As noted above, the various examples disclosed herein can take in terms of what the "system" covers different approaches. In one aspect, the system may focus on the router 214 or computing device that is used to manage the process and enable the client device 202 and the server 222, or the first access point 206 and a second access point 218 to communicate and achieve a secure multi-party computation. In this regard, an example system includes one or more processors, a data storage device and a computer-readable storage device storing instructions which, when executed by the one or more processors, cause the one or more processors to perform one or more operations. The operations can include establishing an application programming interface for coordinating joint operations between a first access point 206 associated with a first entity 202 and a second access point 218 associated with a second entity 222 related to performing a secure prediction task in which the first access point 206 and the second access point 218 will perform private computation of first data 204 of the first entity 202 stored on the first access point 206 and second data 220 of the second entity 222 stored on the second access point 218 without the first entity 202 having access to second data 220 of the second entity 222 having access to the first data 204.

The operations can further include storing a list of assets' metadata on the data storage device, the list of assets representing metadata about the data 204 and the second data 220 while the first data 204 remains stored on the first access point 206 and the second data 220 remains stored on the second access point 218. The metadata can include one or more of the data type, the data size, the data shape and/or a model input shape, for example.

Figure 4:
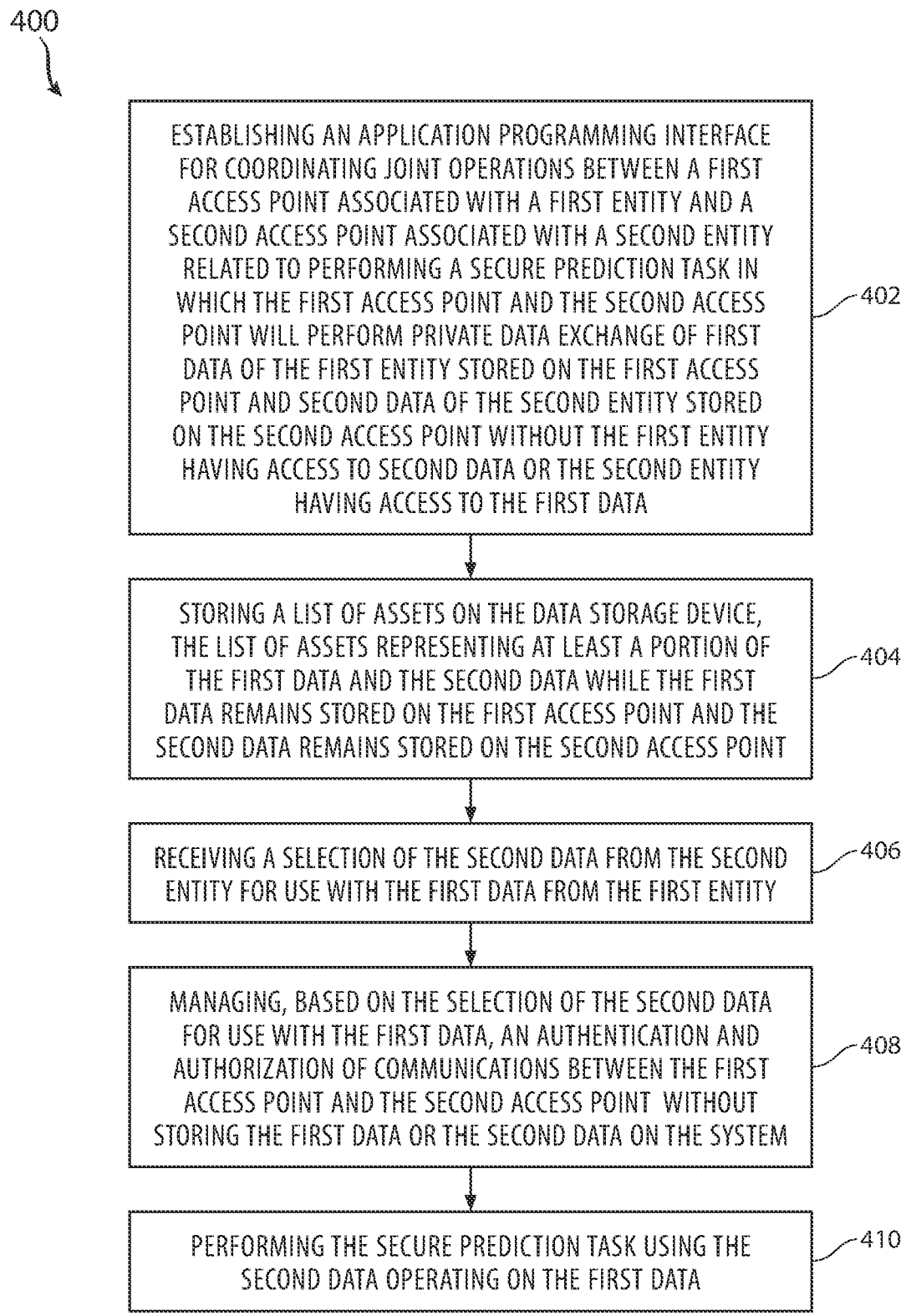
FIG. 4 illustrates a method embodiment.

FIG. 4 illustrates an example method 400 from the standpoint of the router 214. The method can include establishing an application programming interface for coordinating joint operations between a first access point 206 associated with a first entity 202 and a second access point 218 associated with a second entity 222 related to performing a secure prediction task in which the first access point 206 and the second access point 218 will perform private computation of first data 204 of the first entity 202 stored on the first access point 206 and second data 220 of the second entity 222 stored on the second access point 218 without the first entity 202 having access to second data 220 of the second entity 222 having access to the first data 204 (402).

The method can further include storing a list of assets on the data storage device, the list of assets representing metadata about the first data 204 and the second data 220 while the first data 204 remains stored on the first access point 206 and the second data 220 remains stored on the second access point 218 (404), receiving a selection of the second data 220 from the second entity 222 for use with the first data 204 from the first entity 202 (406) and managing, based on the selection of the second data 220 for use with the first data 204, an authentication and authorization of communications between the first access point 206 and the second access point 218 without storing the first data 204 or the second data 220 on the system 214 (408). The method 400 can also include performing the secure prediction task using the second data 220 operating on the first data 204 (410).

The method of operations can further include establishing a user-interface that enables the first entity 202 and the second entity 222 to perform management tasks associated with their asset listings.

In one aspect, the second data 220 can include an algorithm which is available from the second access point 218 for use in performing the secure prediction task on the first data 204 from the first access point 206. The secure prediction task can include in one example a secure multi-party computation. Other computations can also be used as well and this disclosure is not limited to just secure multi-party computations unless so claimed.

The operations can further include determining a first parameter defining an operation to use for the secure prediction task, determining a second parameter defining a dataset to use for the secure prediction task, determining a third parameter defining a type of security to use for the secure prediction task, determining a fourth parameter defining a data type for the for the secure prediction task and determining a fifth parameter defining a data shape for the for the secure prediction task.

The router 214 can also include other functionality such as providing an audit trail associated with completing the secure prediction task.

In one aspect, the first entity 202 can be associated with a first computer server having a first software development kit (SDK) 208 enabling access to the system 214 and for transferring the first data 204 to the first access point 206. The second entity 222 can be associated with a second computer server having a second software development kit 208 enabling access to the system 214 and for transferring the second data 220 to the second access point 218. Note that the SDK 208 can also be configured on the respective access points 206, 218 as well. In another aspect, software components associated with the SDK 208 can be spread across multiple devices or on multiple virtual machines.

In one aspect, the second entity 222 can be enabled to list the second data 220 for public notice via the second software development kit 208 configured on the second computer server 222. In this scenario, the second data 220 is not uploaded to the system 214 but only a reference to the second data 220 is listed by the system 214 for selection by another party. The second data 220 can include at least one computer model.

In one aspect, the first access point 206 is at a first location associated with the first entity 202 behind its firewall 210 and the second access point 218 is at a second location associated with the second entity 222 and behind its firewall 216. The first access point 206 and the second access point 218 communicate with each other directly using a secure communication channel as managed by the system 214.

The operation of performing the secure prediction task using the second data 220 operating on the first data 204 further can include performing a first phase of preprocessing to compute a majority part of known multiplication operations and/or AND gates based on an existing model and a second phase of performing actual computations involving the first data 204 and the second data 220.

In one aspect, the first software development kit 208 enables the first entity to perform one or more of exploring assets including the second data 220 for use with the first data 204, starting tasks associated with the first data 204, viewing results of the secure prediction task, providing permit and audit requests to the system 214 and positioning and managing the first data 204 on the first access point 206.

The operation of managing, based on the selection of the second data 220 for use with the first data 204, the authentication and authorization of communications between the first access point 206 and the second access point 218 without storing the first data 204 or the second data 220 on the system 214 and performing the secure prediction task using the second data 220 operating on the first data 206 further can include receiving a bundle of data at the system 214 associated with details about performing the secure prediction task, validating an existence of the first data 204 and the second data 220 for performing the secure prediction task, confirming with an existing agreement, if any, that a proposed use of one of the first data 204 and the second data 220 matches parameters within the existing agreement to yield a confirmation, granting, based on the confirmation, permission to use one or more of the first data 204 or the second data 220 and contacting the first access point 205 to provide a notification that the secure prediction task can begin.

The first access point 206 can contact the second access point 218 to create a temporary connection for the secure prediction task. The second access point 218 can verify an identity of the first access point 206 and confirm with the system 214 that the temporary connection is appropriate and associated with the secure prediction task. When the secure prediction task is approved by the system 214, the first access point 206 and the second access point 218 can perform the secure prediction task.

In another aspect, the secure prediction task can include a first portion of a first one-way encrypted version of the first data 204 is provided and a second portion of a second one-way encrypted version of the second data 220 is provided in a jointly-proceeded computation in which each of the first access point 206 and the second access point 218 provide a respective portion of computational resources and exchange intermediate one-way encrypted state data. As the secure prediction task ends with a result being received and stored on the first access point 206 based on a completion of the secure prediction task using the first data 204 and the second data 220.

The first entity 202 may have requested the secure prediction task using the second data 220 as an algorithm for processing the first data 204 on the first access point 206. In other words, data owners may seek and select the algorithm or model they desire to operate on their data to receive a prediction result.

In one aspect, the secure multi-party computation (SMPC) prediction task utilizes a Beaver service 224 shown in FIG. 2 that provides and caches pre-computed Beaver sets of data for use in connection with the secure prediction task. In a secure 3-party computation, one of the parties 224 can provide a service utilized by the other two parties 202, 222 in the SMPC operation. The disclosure refers to this as a "Beaver service" due to the information provided by the service. A Beaver Set or Beaver Triple is a group of numbers (typically three but other values can apply as well) with special mathematical properties relating them. Typically, the process of calculating these values as part of the SMPC operation is computationally expensive because it is a process where an operation is performed by more than one party. The beaver service 224 can optionally be applied and act as a cache of computational power and randomness. Utilizing the beaver service 224 allows the optimization or improvement of SMPC computations between the multiple parties 202, 222. The generation of the required beaver sets is delegated to the beaver service 224. The service 224 can pre-compute beaver sets and cache them in anticipation of future requests.

One aspect of this disclosure can be operations from the standpoint of the beaver service 224 in the context of providing secure multi-party computation via the API 212. The API 212 can be configured to enable the beaver service 224 to also communicate data necessary for the computation, such as the beaver set, in connection with the other data provided by the two parties 202, 222 as part of the computation.

The secure prediction task can utilize one or more approaches. For example, a first private comparison approach can be deployed which compares a first number and a second number in which a difference of the first number and the second number is computed and binarized to yield a binarized result and a most significant bit of the binarized result determine whether the first number is less than or equal to the second number. The idea is to compute the difference of two numbers and binarize the difference and add the results using a Private Adder to check the last significant bit to see if the result is positive or negative. In a multi-party computation approach based on the additive share system, comparing two numbers a, b is the most challenging primitive to build. One solution is to compute the difference of two numbers a, b and then check if it is greater or smaller than zero by binarizing the result and checking the last significant bit.

In one example, suppose the system supports 3-bit integers. It can be assumed that

−3=101
−2=110
−1=111
0=000
1=001
2=010
3=011
4=100

If the system wants to compare the numbers 1 and 4, it computes 1-4=−3 and checks the last significant bit of −3 which is 1. Based on this check, the system learns that 1<4. On the other hand, to compare 4, 1 the difference is 4−1=3 whose most significant bit equals 0. In this case, the system learns that 4>1. After subtracting numbers, the system needs to add two shares using a Private Adder to check the MSB (most significant bit).

Another approach that can be used is a second private comparison approach in which the first number and the second number having two binary shares that are added to check the most significant bit using a Brent Kung circuit consisting of only AND and XOR gates. In multi-party computation protocol when the system is computing private comparison, in some cases it needs to add two binary shares privately to check the most significant bit. One of the solutions for completing this operation is to use the Brent Kung circuit to add shares privately. Secure Multi party computation only supports addition and multiplication gates which are equivalent to XOR and AND gates. The Brent Kung circuit consists of only AND and XOR gates so the system can evaluate it using secure multi party computation. There are advantages to using this approach. To add two n-bit numbers, the Brent Kung circuit requires log n+1 rounds of communications. On the other hand, the implementation of Brent Kung adder can be much more complicated than other adders such as the ripple carry adder. The reason that this protocol could be helpful is that the depth of the AND gates is O(log n) so it reduces the number of rounds of communication.

The following is an example of the Brent Kung Adder Implementation:

Considering that $A=a_n a_{n-1} \ldots a_1$ and $B=b_n b_{n-1} b_1$ both be n-bit binary numbers.

With sum being $S=s_{n+1} s_n \ldots s_1$ and carry generated in each stage $C=c_n \ldots c_0$ will be carry-in to next stages.

For RCA, $c_0=0$, and i the sum bit and carry bit generated are $c_i=g_i \vee (a_i \wedge c_{i-1}) \vee (b_i \wedge c_{i-1})$,
$s_i=a_i \oplus b_i \oplus c_{i-1}$ for i=1, 2, . . . n
$s_{n+1}=c_n$ respectively.

It is possible to transform the above ripple carry into carry-lookahead (CLA) by defining the carry bit i as $c_0=0$, $$c_i=(a_i \wedge b_i) \vee (p_i \wedge c_{i-1}) \text{ where}$$

$g_i=a_i \wedge b_i$ and $p_i=a_i \oplus b_i$ for i=1, 2, . . . n. p and g are known as carry propagate and carry generate. This corresponds to the fact that the carry c is either generated by ai and bi or propagated from the previous carry $c_{i-1}$.

Brent and Kung further transformed the carry generation and propagation by defining an operator o as:

$$(a_1,b_1)o(a_2,b_2)=(a_1 \vee (b_1 \wedge a_2), b_1 \wedge b_2).$$

They also defined a function $(G_n, P_n)=(g_1, p_1)$ for i=1; otherwise (gi, pi)o(Gi−1, Pi−1) for i=2, 3, . . . n. It can be derived that $G_i$ in the function is equivalent to $c_i$. Also $(G_n, P_n)$ can be non-recursively written as $=(g_n, p_n)o (g_{n-1}, p_{n-1})o \ldots o(g_1, p_1)$.

Taking advantage of the associativity of operator $o(G_n, P_n)$ can be computed in a tree-like manner using a tree structure.

Another approach is to use a third private comparison approach in which the first number and the second number having two binary shares that are added to check the most significant bit using a ripple carry circuit consisting of only AND and XOR gates and which at each step a carry is computed from a previous step and added to a current sum.

In multi-party computation protocol when the system is computing private comparison, it often needs to add two binary shares privately to check the most significant bit. One of the solutions is to use the Ripple Carry adder circuit to add shares privately. Secure multi-party computation only supports addition and multiplication gates which are equivalent to XOR and AND gates. The Ripple Carry adder circuit consists of only AND and XOR gates so the system can evaluate it using secure multi party computation. To add two n-bit numbers, the Ripple Carry adder circuit requires n rounds of communications on the other hand the implementation of Ripple Carry adder circuit is much easier than other adders, so there is a trade-off between the implementation and the number of rounds of communication.

To add two numbers at each step, the system can compute the carry from the last step and add it to the current sum. For example, to compute $a=a_n \ldots a_2 a_1$, and $b=_n \ldots b_2 b_1$ carry of step m could be computed as follows: carry(m)=carry(m−1) XOR [[carry(m−1) XOR a(m−1)] AND [carry(m−1) XOR b(m−1)]]. This is similar to the traditional addition. For example, when adding 3123 and 999, the process starts by adding 9+3 to arrive at 12. Since 12 is greater than 10, the process is to carry the "1" and add it to the next digit addition. This is a similar process but in the binary space.

Yet another secure third-party computation approach includes wherein a third party is added such that the first entity 202 or the second entity 222 colludes with the third party such that the third party generates at least one beaver triple randomly as part of the secure prediction task. The main idea of 2-party computation is to enable two parties to evaluate a function on their inputs privately such that no party sees the other party's private data as outlined above. In one example implementation, a 3-party computation entity can be adding as a new party called a "trusted party" which can be a Beaver set service 224 shown in FIG. 2 to facilitate and accelerate the computational protocols. Although it's called "trusted party", there is no need to actually trust this party as they cannot act maliciously and learn any private data.

There is a threat model that this approach can address. The only security degradation that might be experienced can occur by introducing a "trusted party" 224 that might collude with one of the participants. In that case, the trusted party and the participant colluding with trusted party can jointly reveal the private data of other parties.

In one application, the system can use the "Trusted Party" 224 to generate beaver triplets (or other data) randomly and then distribute them between participants. In another application, the system 200 uses the trusted party 224 to accelerate some of the protocols (e.g., using private compare). There are advantages to this approach as long as the party 224 is truly "trusted." The system can a substantial performance boost (e.g., 120× in some cases). In a 2-party computation setup, it takes about two minutes to evaluate a 4-layer convolutional neural network. However, using 3-party computation, the system 200 can reduce it to one second by introducing the trusted party 224 and let them generate the beaver triples.

In one aspect, the secure third-party computation approach further addresses the potential problem of the third-party 224 colluding with the first entity 202 to jointly reveal the first data 204 to the second entity 222. Such potential collusion is part of a security model to protect against. The parties will know using the approach disclosed herein that if the other party colludes with the third party, the third party is able to reveal the private data. To address this potential collusion, the private comparison further can utilize a private adder to add two shares to check the most significant bit.

In yet another approach, the system can use a pseudo random number generator approach in which a trusted third party 224 and the first entity 202 and/or the second entity 222 select a common seed during a preprocessing stage of the secure prediction task and a pseudo random number generator is used to reduce a communication size during a beaver triple generation phase. In one example, the pseudo random number generator can be part of the third party 224 or a separate entity. The idea in this scenario is to incorporate the pseudo random generator to reduce the communication size during the beaver triple generation. Beaver triples are used as noted in several examples above to compute the multiplication gate in secure multi-party computation. One solution is to let the trusted party 224 generate two sets of beaver triples and distribute them between the participants 202, 222. If the system 200 wants to compute m multiplications, the trusted party 224 will generate two m-x-3 matrices and send them to the participants 202, 222 so that there will be 6 m integers communications.

A new or another approach is to let the trusted party (which can be called $u_3$) 224 and the other two parties ($u_1$ and $u_2$) 202, 222 select a common seed during the preprocessing stage mentioned above. The common seed can be such that $u_3$ 224 and $u_1$ 202 know $S_{13}$ and $u_3$ 224 and $u_2$ 222 know $S_{23}$. $S_{23}$ is not known by $u_1$ 202 and $S_{13}$ is not known by $u_2$ 222. In this scenario, $u_2$ 222 generates $B_2$ an m-x-3 matrix and uses it as the beaver triples using $S_{23}$. Then $u_1$ 202 generates $B_1$ a m-x-2 matrix using $S_{13}$. Next, $u_3$ 224 generates $B_2$ using $S_{23}$ and generates $B_1$ using $S_{13}$ and computes the third column of $B_1$ as follow and sends it $u_1$ 202:

$$B1[,2]=B2[,2]-(B2[,0]+B1[,0])(B2[,1]+B1[,1])$$

An advantage of this approach is that it reduces the communication to m from 6 m, which is six times smaller.

Figure 5:
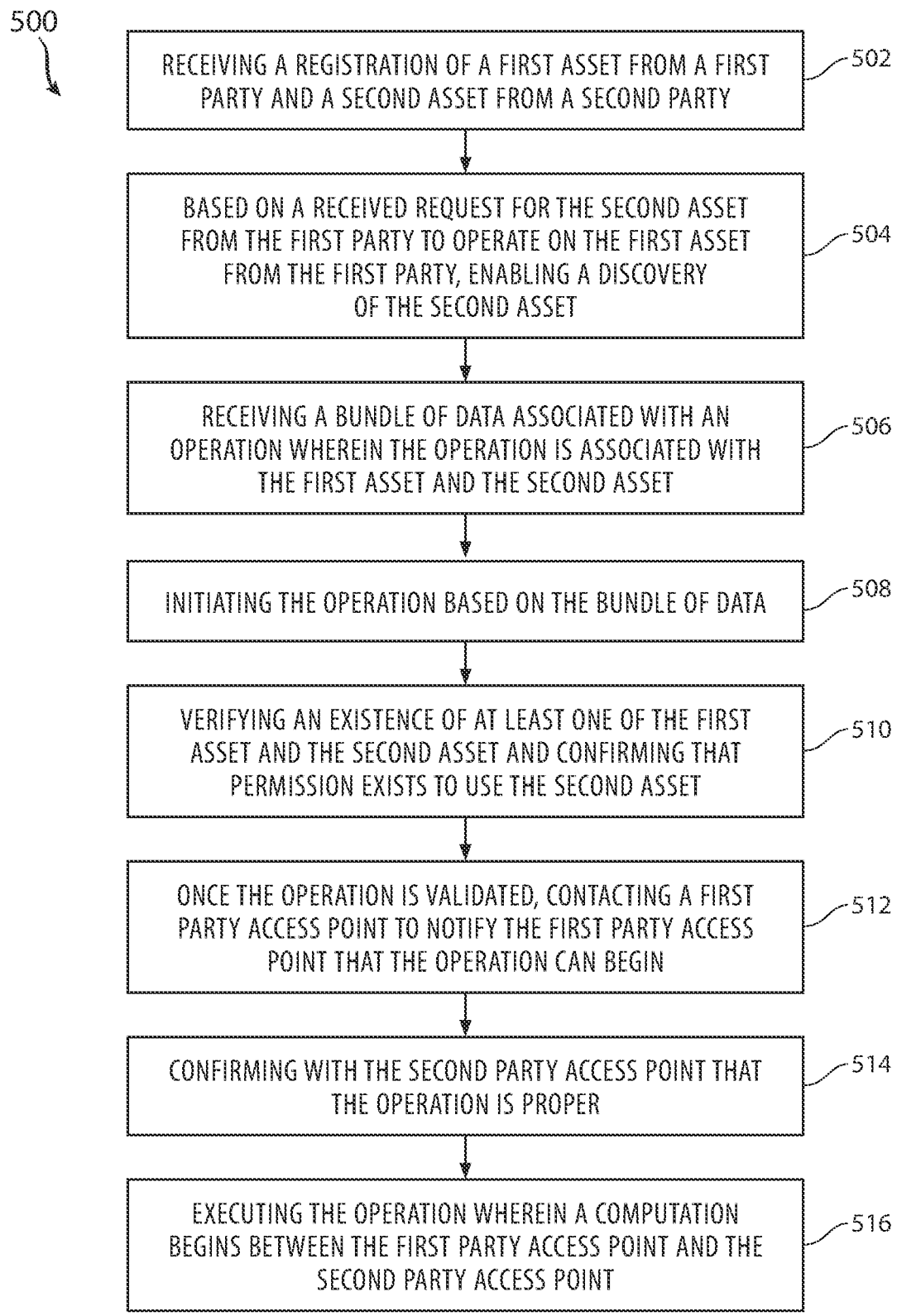
FIG. 5 illustrates another method embodiment.

FIG. 5 illustrates another method 500 disclosed herein from the standpoint of the router 214. The method 500 can include one or more steps in any order including receiving a registration of a first asset from a first party and a second asset from a second party (502). The method can further include based on a received request for the second asset from the first party to operate on the first asset from the first party, enabling a discovery of the second asset (504), receiving a bundle of data associated with an operation wherein the operation is associated with the first asset and the second asset (506), initiating the operation based on the bundle of data (508), verifying an existence of at least one of the first asset and the second asset and confirming that permission exists to use the second asset (510).

The method can further include, once the operation is validated, contacting a first party access point 206 to notify the first party access point 206 that the operation can begin (512). The first party access point 206 will contact the second party access point 218 to create a temporary connection for the operation. The second party access point 218 will verify the identity of the first party and the operation with the router 214 before accepting the connection. In this regard, the method can include confirming with the second party access point 218 that the operation is proper (514) and executing the operation wherein a computation begins between the first party access point 206 and the second party access point 218 (516).

When the computation involves a secure multi-party computation, portions of a one-way encrypted version of both the data (first asset 206) and the algorithm (second asset 218) are exchanged. Then the computation proceeds jointly, with each of the access points 206, 218 providing some of the computational resources and exchanging intermediate one-way encrypted state data as the algorithm progresses. Once the algorithm completes, the result emerges un-encrypted and is stored as a new asset behind the first party access point 206.

In one aspect, each party can independently register the existence of respective assets which exist behind their respective access point 206, 218. This registration creates an entry in the router 214, creating a unique asset ID from which the owner of the respective asset and location of the respective asset can be determined.

In one aspect, the router 214 provides both graphical and programmatic mechanisms for parties to find and obtain information about registered assets. A unique identifier for each asset is thus available. The exact content of the asset remains hidden behind the respective access point 206, 218. Asset owners can expose meta information such as a name, a textual description, various types of summaries (such as an Exploratory Data Analysis) and/or a pseudo-sample of the respective asset 204, 220.

In one aspect, the router 214 can verify the existence of the assets 204, 210, then will confirm that permission exists to use them. Any existing agreements between the parties will first be checked to see if the proposed use matches the agreement parameters. For example, an agreement may provide that party A will allow party B to perform the specific algorithm 220 on the specific data asset 204 at any time. The agreement can also include limitations such as cost, timing, volume of data, how long the asset 220 can be used, how many times an asset can be used, and so forth. If a match is found, permission is granted. Until Permission is granted for all assets involved in the operation, the operation will not begin execution.

If no matching agreement is found for any of the assets, the owner of the asset is notified of a request to utilize their asset in the operation. The owning party can accept or reject the usage request.

This disclosure presents a novel cryptographic protocol for secure MPC. In particular, the approach introduces a set of innovative cryptographic primitives based on arithmetic and boolean MPC that operates on any arbitrary function. This disclosure explains how the system 200 can aid neural network inference and achieve two significant milestones: (1) outperform current state-of-the-art MPC inference protocols and (2) provide an automated, user-friendly system with a set of APIs that allow providing and consuming DL models for industry-scale applications.

Figure 6:
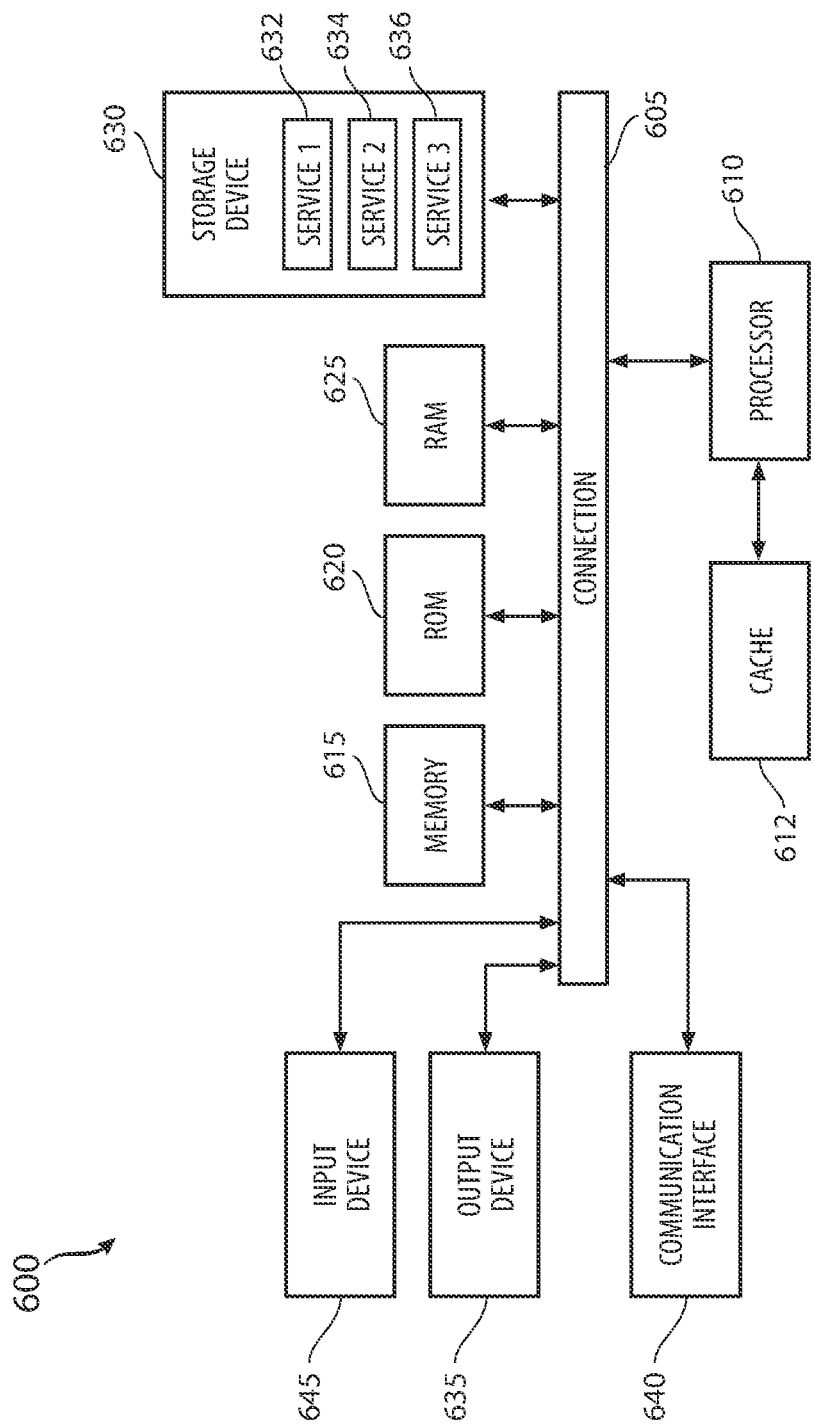
FIG. 6 illustrates an example system embodiment.

FIG. 6 illustrates example computer device that can be used in connection with any of the systems disclosed herein. In this example, FIG. 6 illustrates a computing system 600 including components in electrical communication with each other using a connection 605, such as a bus. System 600 includes a processing unit (CPU or processor) 610 and a system connection 605 that couples various system components including the system memory 615, such as read only memory (ROM) 620 and random-access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general-purpose processor and a hardware or software service or module, such as service (module) 1 632, service (module) 2 634, and service (module) 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services or modules 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

We claim:

1. A system comprising:
    one or more processors;
    a data storage device; and
    a computer-readable storage device storing instructions which, when executed by the one or more processors, cause the one or more processors to perform operations comprising:
        establishing an application programming interface for coordinating joint operations between a first access point associated with a first entity and a second access point associated with a second entity, wherein the joint operations are related to performing a secure prediction task in which the first access point and the second access point will perform private computation of first data of the first entity stored on the first access point and second data of the second entity stored on the second access point without the first entity having access to second data or the second entity having access to the first data;
        storing a list of assets on the data storage device, the list of assets representing metadata about the first data and the second data while the first data remains stored on the first access point and the second data remains stored on the second access point;
        receiving a selection of the second data from the second entity for use with the first data from the first entity;
        managing, based on the selection of the second data for use with the first data, an authentication and authorization of communications between the first access point and the second access point without storing the first data or the second data on the system; and
        performing the secure prediction task using the second data operating on the first data.

2. The system of claim 1, wherein the computer-readable storage device stores additional instructions which, when executed by the one or more processors, cause the one or more processors to perform operations further comprising:
    establishing a user-interface that enables the first entity and the second entity to perform management tasks associated with asset listings.

3. The system of claim 1, wherein the computer-readable storage device stores additional instructions which, when executed by the one or more processors, cause the one or more processors to perform operations further comprising:
    receiving the selection of the second data from the second entity as a selection of a model for use with the first data from the first entity.

4. The system of claim 1, wherein the second data comprises an algorithm which is available from the second access point for use in performing the secure prediction task on the first data from the first access point.

5. The system of claim 1, wherein the secure prediction task comprises secure multi-party computation.

6. The system of claim 1, wherein the computer-readable storage device stores additional instructions which, when executed by the one or more processors, cause the one or more processors to perform operations further comprising one or more of:
  determining a first parameter defining an operation to use for the secure prediction task;
  determining a second parameter defining a dataset to use for the secure prediction task;
  determining a third parameter defining a type of security to use for the secure prediction task;
  determining a fourth parameter defining a data type for the for the secure prediction task; and
  determining a fifth parameter defining a data shape for the for the secure prediction task.

7. The system of claim 1, wherein the computer-readable storage device stores additional instructions which, when executed by the one or more processors, cause the one or more processors to perform operations further comprising one or more of:
  providing an audit trail associated with completing the secure prediction task.

8. The system of claim 1, wherein the first entity is associated with a first computer server having a first software development kit enabling access to the system and for transferring the first data to the first access point and wherein the second entity is associated with a second computer server having a second software development kit enabling access to the system and for transferring the second data to the second access point.

9. The system of claim 8, wherein the second entity is enabled to list the second data for public notice via the second software development kit configured on the second computer server, wherein the second data is not uploaded to the system but only a reference to the second data is listed by the system.

10. The system of claim 9, wherein the second data comprises at least one computer model.

11. The system of claim 1, wherein the first access point is at a first location associated with the first entity and the second access point is at a second location associated with the second entity.

12. The system of claim 1, wherein the first access point and the second access point communicate with each other directly using a secure communication channel as managed by the system.

13. The system of claim 1, wherein performing the secure prediction task using the second data operating on the first data further comprises performing a first phase of preprocessing to compute a majority part of known multiplication operations and/or AND gates based on an existing model and a second phase of performing actual computations involving the first data and the second data.

14. The system of claim 1, wherein the first software development kit enables the first entity to perform one or more of exploring assets comprising the second data for use with the first data, starting tasks associated with the first data, viewing results of the secure prediction task, providing permit and audit requests to the system and positioning and managing the first data on the first access point.

15. The system of claim 1, wherein managing, based on the selection of the second data for use with the first data, the authentication and authorization of communications between the first access point and the second access point without storing the first data or the second data on the system and performing the secure prediction task using the second data operating on the first data further comprise:
  receiving a bundle of data at the system associated with details about performing the secure prediction task;
  validating an existence of the first data and the second data for performing the secure prediction task;
  confirming with an existing agreement, if any, that a proposed use of one of the first data and the second data matches parameters within the existing agreement to yield a confirmation;
  granting, based on the confirmation, permission to use one or more of the first data or the second data;
  contacting the first access point to provide a notification that the secure prediction task can begin, wherein the first access point contacts the second access point to create a temporary connection for the secure prediction task and wherein the second access point verifies an identity of the first access point and confirm with the system that the temporary connection is appropriate and associated with the secure prediction task and wherein when the secure prediction task is approved by the system, the fist access point and the second access point perform the secure prediction task.

16. The system of claim 1, wherein the secure prediction task comprises a first portion of a first one-way encrypted version of the first data is provided and a second portion of a second one-way encrypted version of the second data is provided in a jointly-proceeded computation in which each of the first access point and the second access point provide a respective portion of computational resources and exchange intermediate one-way encrypted state data and wherein as the secure prediction task ends with a result being received and stored on the first access point based on a completion of the secure prediction task using the first data and the second data.

17. The system of claim 16, wherein the first entity requested the secure prediction task using the second data as an algorithm for processing the first data on the first access point.

18. The system of claim 1, wherein the secure prediction task utilizes a Beaver service that provides Beaver sets of data for use in connection with the secure prediction task.

19. The system of claim 1, wherein the secure prediction task utilizes one or more of:
  a first private comparison approach of comparing a first number and a second number in which a difference of the first number and the second number is computed and binarized to yield a binarized result and a most significant bit of the binarized result determine whether the first number is less than or equal to the second number;
  a second private comparison approach in which the first number and the second number having two binary shares that are added to check the most significant bit using a Brent Kung circuit consisting of only AND and XOR gates;
  a third private comparison approach in which the first number and the second number having two binary shares that are added to check the most significant bit using a ripple carry circuit consisting of only AND and XOR gates and which at each step a carry is computed from a previous step and added to a current sum;
  a secure third-party computation approach in which a third party is added such that the first entity or the second entity colludes with the third party such that the third party generates at least one beaver triple randomly as part of the secure prediction task; and
  a pseudo random number generator approach in which a trusted third party and the first entity and the second entity select a common seed during a preprocessing stage of the secure prediction task and a pseudo random number generator is used to reduce a communication size during a beaver triple generation phase.

20. The system of claim 19, wherein the secure third-party computation approach further comprises the third party colluding with the first entity to jointly reveal the first data to the second entity.

21. The system of claim 1, wherein the private comparison further utilizes a private adder to add two shares to check the most significant bit.

22. A method comprising:
- establishing, via a computing device, an application programming interface for coordinating joint operations between a first access point associated with a first entity and a second access point associated with a second entity, wherein the join operations are related to performing a secure prediction task in which the first access point and the second access point will perform private computation of first data of the first entity stored on the first access point and second data of the second entity stored on the second access point without the first entity having access to second data or the second entity having access to the first data;
- storing a list of assets on the data storage device, the list of assets representing metadata about the first data and the second data while the first data remains stored on the first access point and the second data remains stored on the second access point;
- receiving a selection of the second data from the second entity for use with the first data from the first entity;
- managing, via the computing device and based on the selection of the second data for use with the first data, an authentication and authorization of communications between the first access point and the second access point without storing the first data or the second data on the system; and
- performing the secure prediction task using the second data operating on the first data.

* * * * *